United States Patent [19]

Smith

[11] 3,717,176
[45] Feb. 20, 1973

[54] HYDRAULIC VALVE
[75] Inventor: Robert D. Smith, Wilmington, Del.
[73] Assignee: E. I. du Pont de Nemours and Company, Wilmington, Del.
[22] Filed: Feb. 26, 1971
[21] Appl. No.: 119,251

[52] U.S. Cl. ................. 137/599, 137/601, 251/5
[51] Int. Cl. ............................................. F16k 7/07
[58] Field of Search .................. 251/5; 137/599, 601

[56] References Cited

UNITED STATES PATENTS

| | | | |
|---|---|---|---|
| 2,690,806 | 10/1954 | Britton et al. | 251/5 X |
| 2,735,642 | 2/1956 | Norman | 251/5 |
| 3,490,732 | 1/1970 | Leroy | 251/5 |

FOREIGN PATENTS OR APPLICATIONS 901,925    7/1962    Great Britain................251/5

Primary Examiner—Robert G. Nilson
Attorney—Wilkin E. Thomas, Jr.

[57] ABSTRACT

The use of a plurality of small fluid tight tubes made from a polyfluorinated plastic in place of the collapsible elastomeric bladder in a hydraulically activated valve, provides a valve which can be used to shut off or control the flow of corrosive liquids in a fluid line.

8 Claims, 7 Drawing Figures

PATENTED FEB 20 1973 3,717,176

INVENTOR
ROBERT D. SMITH

BY  *William E. Thomas Jr.*
ATTORNEY

HYDRAULIC VALVE

BACKGROUND OF THE INVENTION

The present invention relates to a new and useful valve for use with corrosive liquids. More specifically, it relates to an improved hydraulically activated valve which can be used to shut-off or control the flow of corrosive liquids in a flow line.

There are a wide variety of valves which are designed for use with corrosive liquids. Most of them are mechanical in nature and, therefore, are either expensive, because they must be made from specially treated metals, or prone to failure because of the corrosive action of the liquid. Because of the difficulty encountered in working with corrosive materials, most of these valves are on-off valves which provide little or no positive control over the flow of the corrosive liquid. There is, therefore, a need for a simple, failure-free, inexpensive valve which can be used to either completely shut off or to provide position control over the flow of corrosive liquid, particularly for use with large diameter flow lines.

One type of valve which seems to be free from most of the difficulties mentioned above is a hydraulically activated valve using a single collapsible elastomeric bladder as the control element. By increasing the external pressure on the bladder, it can be collapsed by varying degrees to complete closure, thereby effectuating control over the flow of liquid through the valve.

While such valves are generally simple, inexpensive, and failure-free, they are not particularly well adapted for use with corrosive liquids since most corrosive liquids will attack the elastomeric material from which the bladder is made. One way to overcome this difficulty is to replace the elastomeric tube with a tube made from a corrosive resistant material such as a polyfluorinated plastic. The problem with this approach is that large single tubes of plastic cannot be collapsed, at least repeditively, without failure.

SUMMARY OF THE INVENTION

The present invention is an improved control valve of the type comprising an external housing having a pair of flanged ends to connect said housing to a fluid line, a deformable conduit connected at its ends to the housing to provide a fluid path through the housing, means for introducing a control fluid into the space between the housing and the conduit and means to control the pressure of the control fluid within the housing, the improvement wherein said conduit comprises a plurality of small fluid tight tubes, made from a polyfluorinated plastic, with their ends secured in fixed, fluid tight relationship to the ends of the valve housing. Each tube must have an outside diameter ranging from 0.1 to 0.75 inch and a wall thickness ranging from 5 to 20 percent of the tube diameter.

If the diameter of the individual tubes falls below a tenth of an inch, the pressure drop across a valve, even one consisting of a larger number of tubes will be greater than can be tolerated in a control valve. If the diameter is greater than three-quarters of an inch, the flex life of the tube decreases to the point where the tubes will fail after they have been collapsed only a few times. If the wall thickness falls below 5 percent of the diameter, the walls become too thin to withstand the normal internal pressure associated with the flow of a liquid through the tubes. If the wall thickness is increased above 20 percent of the tube diameter, the flex life of the tubes decreases and once again failure results. The optimum tube diameter will vary with the type of fluoropolymer used, but for tubes made from Teflon FEP fluoropolymer resin, a preferred material, the diameter should range from 0.1 to 0.5 inch, with wall thickness ranging from 5 to 15 percent of the diameter, with the preferred embodiment being a tube having an outer diameter of about one-fourth inch and a wall thickness of about 0.025 inch.

The polyfluorinated plastic is preferably a polymer of tetrafluoroethylene or a copolymer of tetrafluoroethylene and hexafluoropropylene, and in the preferred embodiment, each of the tubes contains a central region that has either been precollapsed or has preformed into an elliptical shape, so that the tube will collapse in this region rather than at its ends. To further protect the points at which the tubes connect to the exterior housing, the ends of the tube adjacent to the housing connection can be potted in an elastomeric material.

BRIEF DESCRIPTION OF THE DRAWINGS

The operation and advantages of the present invention can best be described with reference to the following figures, in which.

DETAILED DESCRIPTION OF DRAWINGS

Figure 1:
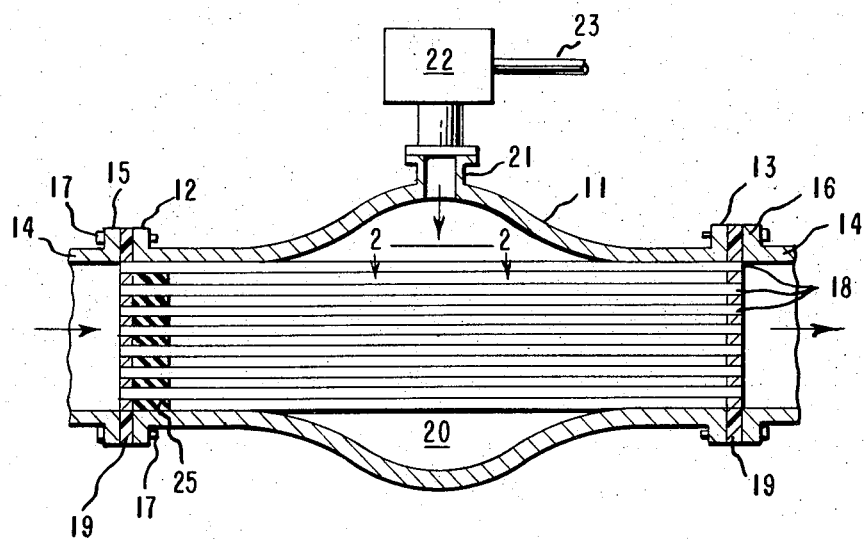
FIG. 1 is a cross sectional view of one embodiment of the present invention.

The valve illustrated in FIG. 1 comprises an exterial housing, 11, having a pair of flanged ends, 12 and 13, which are adapted to connect the housing into a fluid line, indicated generally by 14. The housing can be made from any suitable material such as steel, cast iron, or even plastic. In the embodiment illustrated, the fluid line has flanged ends 15 and 16 and the connection is made by bolts 17, but any suitable connection can be used. A plurality of small fluid tight tubes 18, made from a polyfluorinated plastic is provided. The tubes are secured in fixed fluid tight relationship to the flanged ends of the housing. In the embodiment shown, the ends of the tube are secured into holes in foraminous tube sheets, 19, made from the same material as the tubes and secured between the flanged ends of the housing, 12 and 13, and the flanged ends of the fluid lines, 15 and 16. While the foraminous tube sheet is illustrated, a honeycomb structure such as that disclosed in U.S. Pat. No. 3,315,740 issued on Apr. 25, 1967 to M. S. Withers and assigned to the assignee of the present invention can also be used as can any other suitable configuration; the only criterion being that the tubes are connected to the flanged ends of the housing in a manner such that the interior of the tubes provide a leak-free fluid path through the housing for the liquid flowing through the fluid line as indicated by the arrows.

Means are provided for introducing a control fluid into the space 20 between the housing and the tubes. In the embodiment illustrated this means comprises a flanged port 21, for the introduction of the control fluid, as indicated by the arrow, into a blind cavity. Means 22 are provided to control the pressure of the control fluid inside space 20. The control fluid can be a liquid or a gas, preferably the former, but it need not be a corrosive fluid, so conventional means such as an electrically controlled pump can be used to force fluid supplied from fluid line 23 into space 20. If the valve is designed to be an on-off valve, means 22 can simply comprise a valve and a pump capable of increasing the pressure of the fluid within space 20 to the point when tubes 18 will collapse completely. If the valve is to be a control valve, designed to vary the flow of line fluid in a controlled manner, more sophisticated means capable of varying the pressure of the control fluid in space 20 must be provided so that the tubes can be collapsed to varying degrees of closure as well as completely collapsed. In either case, such devices are well known to those skilled in the art of fluid control.

Space 20 can be a blind cavity, as discussed above, or an open cavity with an outlet, not shown, to allow continuous flow of the control fluid through the cavity. Control of the pressure inside cavity 20 can then be accomplished by valving means attached to the outlet so that means 22 can be a constant pressure device. The only criterion is that the control means is capable, on command, of producing a pressure in cavity 20 that will collapse tubes 18.

Since the valve is designed for use with corrosive liquid, and also with liquid containing entrapped particles, the valve should be made from a corrosion resistant, non-stick type material, i.e., a polyfluorinated plastic such as a polymer of tetrafluoroethylene or a copolymer of tetrafluoroethylene and hexafluoropropylene. Because this rather rigid plastic rather than an elastomer must be used, there are restrictions imposed on the dimensions of the tubes. The limits of these restrictions can be seen by reference to FIGS. 4 and 5.

Figure 4:
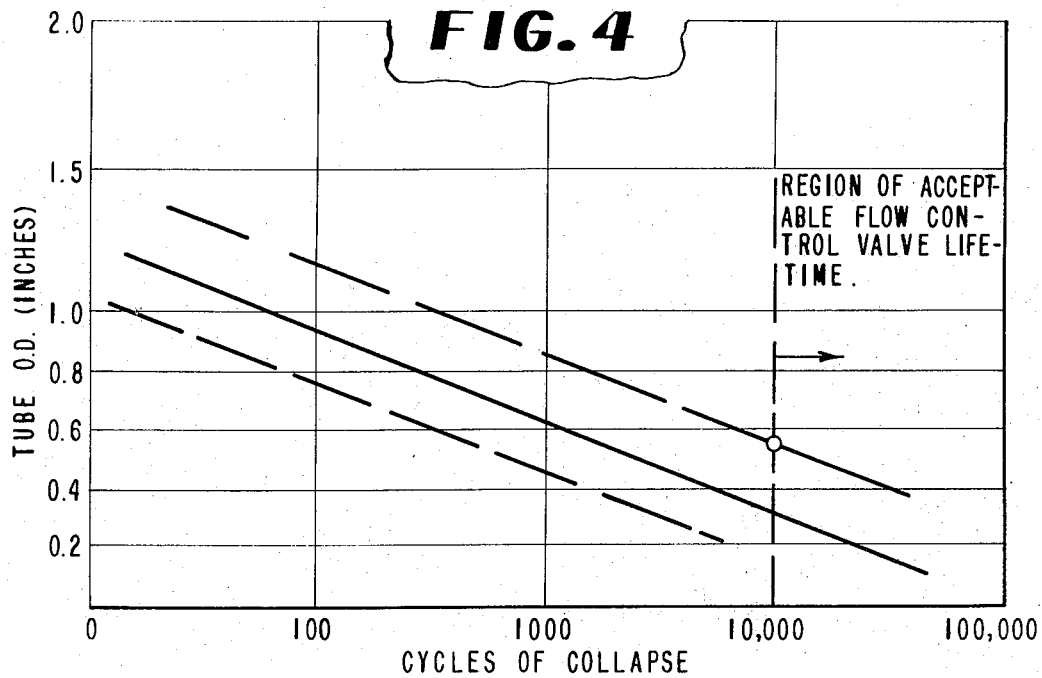
FIG. 4 is a plot of the number of cycles of complete collapse to failure versus tube diameters.

FIG. 4 is a plot of the number of cycles of complete collapse to produce failure versus the outer diameter of the tube in inches. The data on the plot were estimated from flex life data obtained on Teflon FEP tubes with wall thicknesses that are 10 percent of the outer diameter. The dashed lines indicate the variation from the average valve shown by the solid line. Practical experience indicates that a valve must undergo at least 10,000 cycles to be acceptable. It can be seen by reference to FIG. 4, then, that tubes having an outside diameter of about an inch can be collapsed repeatedly without failure, but to achieve the 10,000 cycle level, the diameter of the tube must be below about 0.55 inch and preferably below about 0.3 inch.

Figure 5:
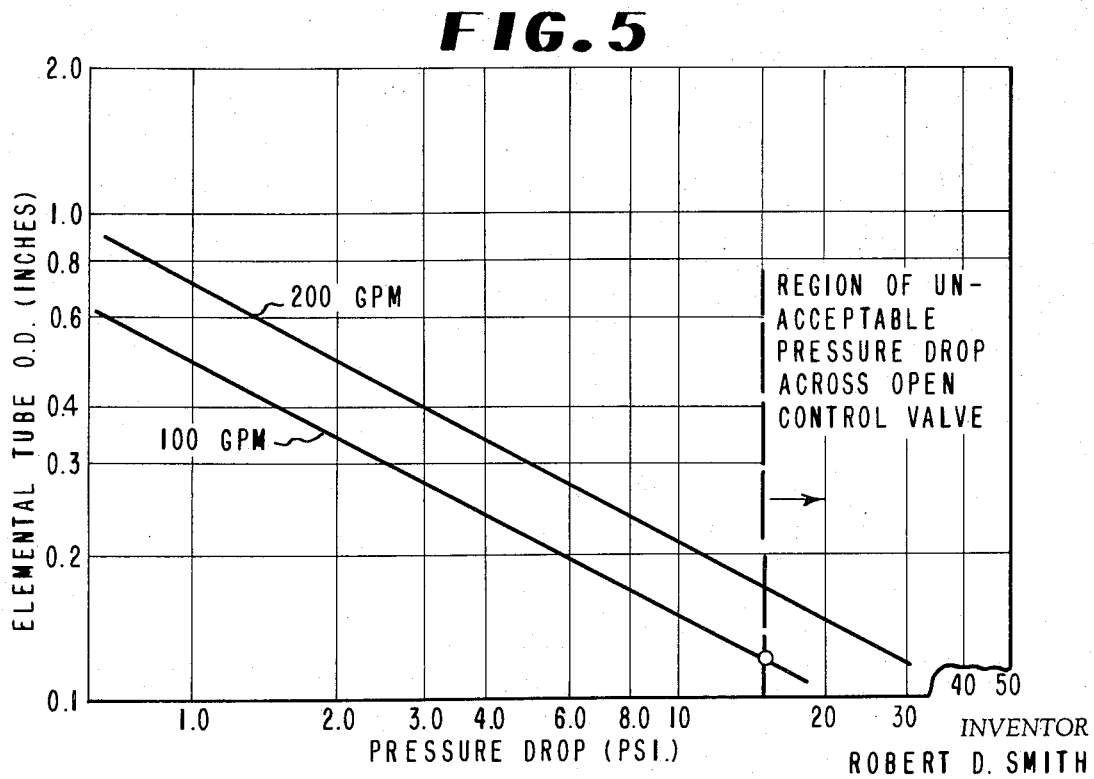
FIG. 5 is a plot of the pressure drop across a 6 inch valve as a function of the individual tube diameter used in the valve.

FIG. 5 illustrates the pressure drop across a 6-inch valve of the present design as a function of the outer diameter of the individual tubes in the valve for both 100 and 200 gpm flow. The tubes have wall thicknesses of about 10 percent of their diameter. Practical experience indicates that a pressure drop greater than 15 psi in such valves is unacceptable with pressure drops as low as 3 – 4 psi being preferred. It can be seen from FIG. 5 that if the outer diameter of the tubes drops below 0.1 inch the pressure drop across the tube becomes unacceptable. The tubes, then, should have a diameter above 0.1 inch, preferably above 0.25 inch.

The tubes used in the present invention, therefore, should have an outer diameter ranging from 0.1 to 0.75 inch with wall thicknesses ranging from 5 to 20 percent of the outer diameter. For a valve using Teflon tubes, a plurality of tubes having about an 0.25 inch outer diameter and 0.025 inch wall thickness seems to be optimum.

Figure 2:
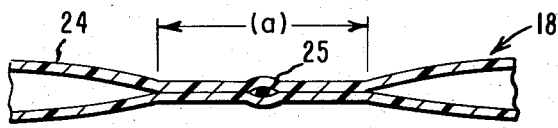
FIG. 2 is a longitudinal sectional view of one of the tubes used in the present invention showing its configuration when collapsed.
Figures 3A, 3B, 3C:
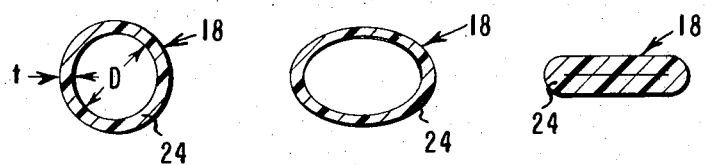
FIGS. 3a, b and c are cross sectional views of one of the tubes used in the present invention showing its configuration under various circumstances.

At room temperature, about 100 psi pressure differential between the pressure inside the tube and the pressure outside the tube is required to collapse a tube made from Teflon FEP, in a manner such as that shown in FIG. 2 and FIG. 3c where the walls 24 of tube 18 are shown collapsed in a region designated by a. In the situation illustrated, the tube is collapsed about an entrapped particle 25 to illustrate that the presence of small solid particles in the line fluid will not hamper the operation of the present invention.

If the tubes have a uniform circular cross section, such as shown in FIG. 3a, when the valve is first put into operation, each tube can and will collapse in a different location along its length. If some tubes collapse near their ends, this tends to rupture the seal between the tubes 18 and the end structure 19, causing a leak. This can be prevented by potting the ends of the tube adjacent to the tube sheet 19 in an elastomer as indicated generally by 25 on the left-hand side of FIG. 1. It is preferable, however, to design the tubes so that they all collapse in a central region rather than at their ends. This can be done in a number of ways. One way is to make the wall of the tube thinner in the central region. Another way is to deform the central portion of the tube to an elliptical shape, such as that shown in FIG. 3b. The elliptical portion is more prone to collapse than a portion having a circular cross section such as that shown in FIG. 3a. There is a simpler way to achieve the same result, however. It has been observed that once a tube has been collapsed in a given region, the pressure required to cause the tube to collapse in that region decreases. For example, if it takes 100 psi to collapse a tube for the first time, only 80 psi is required to collapse the tube thereafter in the original collapsed spot, while the full 100 psi is needed to collapse the tube elsewhere. This fact, coupled with the fact that the pressure required to collapse a tube decreases as the temperature increases, allows pretreatment of the tubes so that they will collapse in a given region. For example, at room temperature, a pressure differential of 100 psi is required to collapse a 0.25 inch Teflon tube with a 0.025 inch wall, but at 300°F. only 35 psi pressure differential is required to collapse the tube. One way to insure localized collapse of the tube, therefore, is to heat a short portion of the tube corresponding to region a in FIG. 2, to a reasonable temperature such as 300°F. and then apply a pressure differential of 70 psi to the tube. This pressure is sufficient to collapse the tube in region a but not to collapse the tube outside this region. Tubes preheated in this manner will preferentially collapse in the desired region and, if used in the valve, will produce a valve that will not fail at the end seals.

What is claimed is:

1. In a control valve for use with corrosive liquids of the type comprising an external housing having a pair of flanged ends to connect said housing into a fluid line, a deformable conduit connected at its ends in fluid tight arrangement to the flanged ends of said housing to provide a fluid path through said housing for the liquid flowing through the fluid line, means for introducing a control fluid into the space between said external housing and said deformable conduit, and means to control the pressure of said control fluid within said housing, the improvement wherein said deformable conduit comprises a plurality of small fluid tight tubes of polyfluorinated plastic having their ends secured in fixed fluid tight relationship to the flanged ends of said housing, said tubes having an outside diameter ranging from 0.1 to about 0.55 inch and a wall thickness ranging from 5 to 20 percent of their outside diameter.

2. The valve of claim 1 wherein said polyfluorinated plastic is a polymer of tetrafluoroethylene.

3. The valve of claim 1 wherein said polyfluorinated plastic is a copolymer of tetrafluoroethylene and hexafluoropropylene.

4. The valve of claim 1 wherein each of said tubes contains a central region having a cross section preformed into an elliptical shape.

5. The valve of claim 1 wherein each of said tubes has been pre-collapsed in a central region so that future collapse will occur preferentially in this region.

6. The valve of claim 1 wherein the exterior of the ends of said tubes adjacent the ends of said housing are potted in an elastomer to prevent rupture of the fluid tight connection between the ends of said tubes and said housing.

7. The valve of claim 1 comprising a plurality of small tubes each made from a polymer of tetrafluoroethylene and having outside diameters of about 0.25 inch and a wall thickness of about 0.025 inch.

8. The valve of claim 1 wherein said tubes have an outside diameter ranging from 0.1 to 0.3 inches and a wall thickness ranging from 5 to 15 percent of their outside diameter.

* * * * *